Jan. 24, 1928.
G. BELLUZZO
1,657,192
WHEEL FOR INTERNAL COMBUSTION TURBINES
Filed March 12. 1924
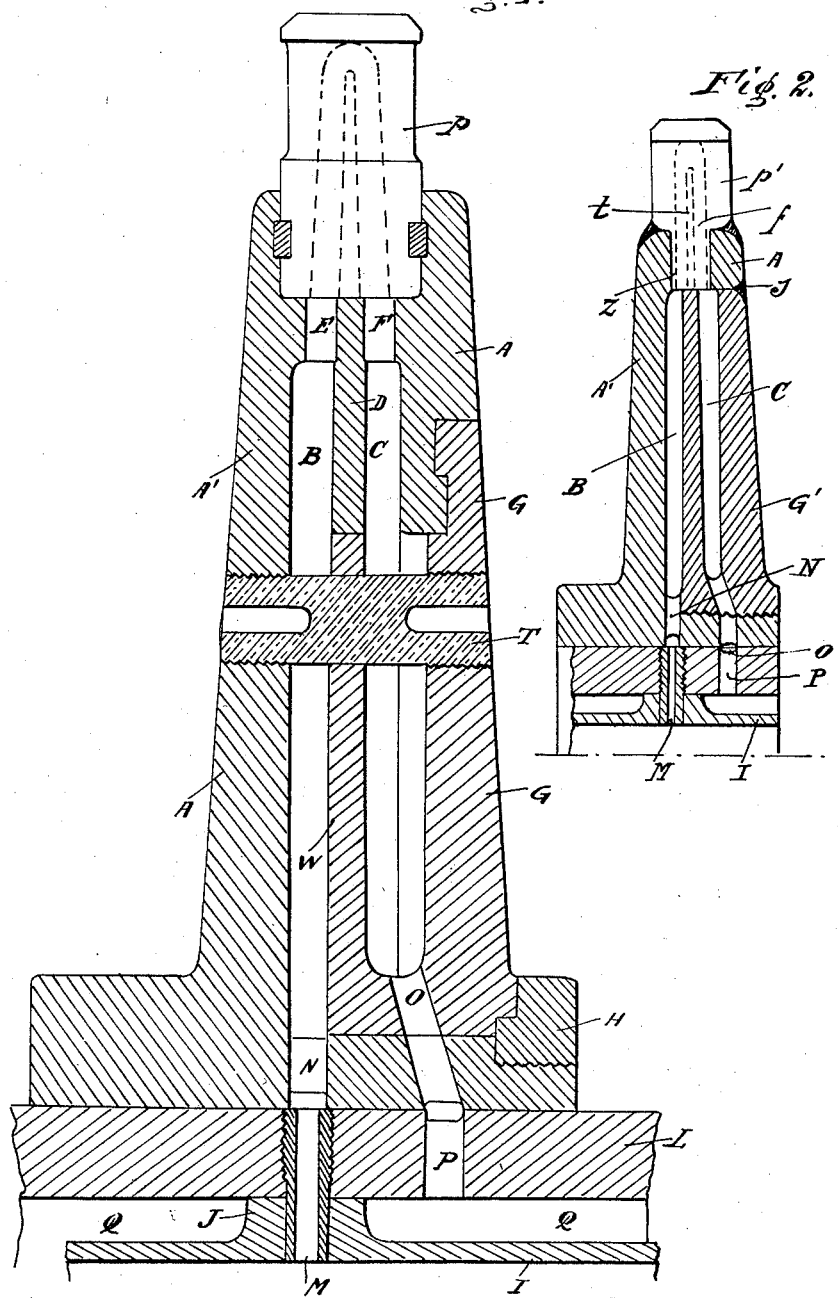
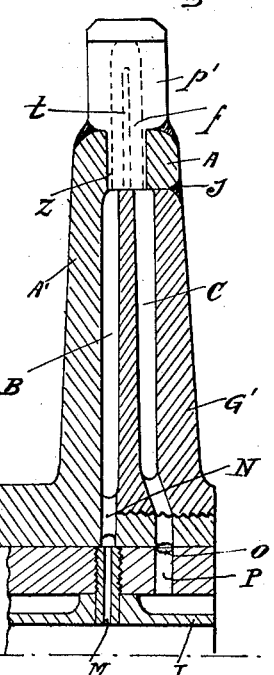
Inventor
G. Belluzzo
By Marks & Clerk, Attys.

Patented Jan. 24, 1928.

1,657,192

UNITED STATES PATENT OFFICE.

GIUSEPPE BELLUZZO, OF MILAN, ITALY.

WHEEL FOR INTERNAL-COMBUSTION TURBINES.

Application filed March 12, 1924, Serial No. 698,742, and in Italy March 22, 1923.

The present invention relates to the construction of the running wheels of internal combustion turbines. The object of the novel construction is to ensure the water circulation both along the wheel walls and in the wheel buckets.

The novel wheels are made in two types corresponding to the relatively slow and heavy turbines and to the high velocity, light turbines that may find their application in aircraft and motor-cars.

Fig. 1 shows the construction of a wheel for an internal combustion turbine of the heavy type in axial section.

Fig. 2 shows, likewise in section, a wheel for light, high speed turbines.

According to the type illustrated in Fig. 1 the wheel is built up of two discs, one disc A being U-shaped in section, with the shanks of the U of unequal length and the shorter shank double-walled (A D), and the other disc G completing the shorter shank of the other disc. The two discs are secured together by means of the ring H screwed upon the hub of the disc A and by a convenient number (that can be determined by calculation) of stay bolts T screw-threaded at the two ends, such as are used in the construction of locomotive fireboxes. The disc G is double-walled and completes the walls A D of disc A.

To the disc A are secured the buckets —p— in which the water circulates in the following manner:

The disc A is secured on the shaft L, this shaft being hollow and having arranged in its central bore a tube I, at one end of which pressure water is let in. The tube I is fitted with projections J serving to center it relatively to the shaft L and fix it thereto by means of small tubes M that are screwed into the shaft L.

Corresponding to each disc there are two or three of these small tubes which, across holes N formed in the hub of disc A, convey the refrigerating water along the internal surface of A into the cavity B connected to all the buckets by means of the ducts E belonging to the buckets —p—.

After circulating through the buckets the water descends through the ducts F into the room C, which is separated from the capacity B by the annular wall D built in the disc A as well as by the internal wall of the disc G fitted to the disc A and secured thereto in the manner already described.

From the room C the water passes with centripetal flow through the holes O formed in the discs A and G and through the holes P formed in the shaft L, and collects in the annular chamber Q which is connected to the refrigerating water outlet.

The construction of the wheels for light, high speed turbines according to Fig. 2 is nearly identical. Also here the wheel is made up of two discs A'—G', the disc G' being secured to the other disc by being screwed upon the hub of A' and peripherally welded on to it at —s—.

The buckets —p'—, of a smaller size, are provided with a blind center bore —f— divided in two by a partition —t— fitted therein. The buckets are provided with a cylindrical extension —z— forming an extension of the bore —f— and projecting into the bore formed in the disc A'.

Two spaces B and C are provided by the discs G'. The water enters the capacity B through the holes N, traverses the buckets —p'— and the space C, and issues through the holes O.

The wheel is secured on a hollow shaft, inside which is arranged the water distributing tube, designed and secured in a similar manner to that already described in connection with the above described wheel.

Having now particularly described and ascertained the nature of my said invention and in what manner the same is to be performed, I declare that what I claim is:—

1. In an internal combustion turbine, a wheel composed of two discs one of which in cross section is in the shape of a U with shanks of unequal lengths while the other of which completes the shorter shank of the first disc, stays securing the outer portions of the discs together, a ring securing the inner hub portions of the discs together, buckets carried by the first disc, and a double wall inside of the wheel for dividing the same into two separate compartments in which flows in opposite directions the refrigerating water for the wheel walls and buckets.

2. In an internal combustion turbine, a hollow shaft, a water distributing tube arranged inside of said shaft, a guiding projection on said tube, a small water conducting tube arranged through the projection and communicating with the distributing tube, the space between the shaft and the distributing tube constituting an annular water discharge chamber, and a wheel mounted on the shaft and provided with a continuous passageway for communication respectively with the small tubes and chamber.

Signed at Milan (Italy), this 23rd day of February.

GIUSEPPE BELLUZZO.